US012625697B2

(12) United States Patent
Lin et al.

(10) Patent No.: US 12,625,697 B2
(45) Date of Patent: May 12, 2026

(54) METHOD FOR AUTOMATICALLY UPDATING FIRMWARE AND HOST DEVICE USING THE SAME

(71) Applicant: Moxa Inc., New Taipei City (TW)

(72) Inventors: Po-Hung Lin, New Taipei City (TW); Chien-Yu Lai, New Taipei City (TW); Chi-Ting Chang, New Taipei City (TW); Wei-Hsi Hsu, New Taipei City (TW)

(73) Assignee: Moxa Inc., New Taipei City (TW)

( * ) Notice: Subject to any disclaimer, the term of this patent is extended or adjusted under 35 U.S.C. 154(b) by 246 days.

(21) Appl. No.: 18/637,457

(22) Filed: Apr. 17, 2024

(65) Prior Publication Data

US 2025/0328332 A1      Oct. 23, 2025

(51) Int. Cl.
*G06F 8/65*          (2018.01)
*G06F 8/654*        (2018.01)

(52) U.S. Cl.
CPC ..................................... *G06F 8/65* (2013.01)

(58) Field of Classification Search
CPC .................................. G06F 8/65; G06F 8/654
See application file for complete search history.

(56) References Cited

U.S. PATENT DOCUMENTS

| | | | | |
|---|---|---|---|---|
| 7,730,326 | B2 * | 6/2010 | Girish ................. | G06F 11/1433 |
| | | | | 713/1 |
| 8,862,787 | B2 * | 10/2014 | Kriegelstein ......... | G06F 9/4411 |
| | | | | 710/16 |

| | | | | |
|---|---|---|---|---|
| 10,496,395 | B2 * | 12/2019 | Brian ..................... | G06F 16/951 |
| 2002/0078142 | A1 * | 6/2002 | Moore ..................... | G06F 8/658 |
| | | | | 709/217 |
| 2003/0023966 | A1 * | 1/2003 | Shimizu ................ | G06F 21/121 |
| | | | | 717/175 |
| 2003/0106051 | A1 * | 6/2003 | Morrison .................. | G06F 8/65 |
| | | | | 717/170 |
| 2003/0106052 | A1 * | 6/2003 | Morrison .................. | G06F 8/65 |
| | | | | 717/170 |
| 2005/0010914 | A1 * | 1/2005 | Liang ......................... | G06F 8/65 |
| | | | | 717/168 |
| 2005/0223373 | A1 * | 10/2005 | Gage ........................ | G06F 8/654 |
| | | | | 717/168 |
| 2008/0307157 | A1 * | 12/2008 | Jang ........................... | G06F 8/65 |
| | | | | 710/63 |
| 2010/0169876 | A1 * | 7/2010 | Mann ........................ | G06F 8/65 |
| | | | | 717/173 |
| 2012/0260244 | A1 * | 10/2012 | Keller ................. | G06F 11/1433 |
| | | | | 717/173 |
| 2013/0103974 | A1 * | 4/2013 | Bower, III .......... | G06F 11/1479 |
| | | | | 714/E11.132 |

(Continued)

FOREIGN PATENT DOCUMENTS

| | | |
|---|---|---|
| TW | 200900944 | 1/2009 |
| TW | 201250594 | 12/2012 |
| TW | 201531943 | 8/2015 |

*Primary Examiner* — Darren B Schwartz
(74) *Attorney, Agent, or Firm* — JCIPRNET

(57) ABSTRACT

The embodiments of the disclosure provide a method for automatically updating a firmware and a host device. The method includes: accessing, by the host device, a target firmware from at least one detachable I/O device connected with the host device; and updating, by the host device, a host firmware of the host device based on the target firmware.

16 Claims, 2 Drawing Sheets

(56) References Cited

U.S. PATENT DOCUMENTS

| 2013/0232478 A1* | 9/2013 | Jeon | G06F 8/654 |
| | | | 717/173 |
| 2014/0068585 A1* | 3/2014 | Young | G06F 21/572 |
| | | | 717/168 |
| 2015/0007161 A1* | 1/2015 | Yagi | G06F 8/65 |
| | | | 717/171 |
| 2017/0364677 A1* | 12/2017 | Soman | G06F 9/45558 |
| 2018/0052677 A1 | 2/2018 | Lodeiro et al. | |
| 2019/0347084 A1 | 11/2019 | Satam et al. | |
| 2019/0354361 A1* | 11/2019 | Li | G06F 8/65 |
| 2021/0397432 A1* | 12/2021 | Le | G06F 8/65 |
| 2021/0400492 A1* | 12/2021 | Movva | H04W 12/069 |
| 2022/0222064 A1 | 7/2022 | Park et al. | |
| 2023/0189453 A1 | 6/2023 | Knatt et al. | |

* cited by examiner

METHOD FOR AUTOMATICALLY UPDATING FIRMWARE AND HOST DEVICE USING THE SAME

BACKGROUND

1. Field of the Invention

The present disclosure generally relates to a mechanism for providing a reality service, in particular, to a method for automatically updating a firmware and a host device.

2. Description of Related Art

Conventionally, it is common for many connected devices or embedded systems to update the firmware thereof over the Internet. In general, these devices may need to connect to the Internet through, for example, Wi-Fi, Ethernet, cellular networks, or other built-in communication interfaces, and then these devices may download the required firmware from the Internet and accordingly update the firmware thereof.

However, for some devices without the abilities to access to the Internet (e.g., lacking of built-in communication interfaces), the above way may not be feasible.

Specifically, for a device without any communication interface, the device may need to be connected with external communication interfaces, such that the device may access the Internet via the external communication interfaces. However, in a case where the device cannot recognize the external communication interfaces connected thereto, the device may not be able to correctly interact with the external communication interfaces connected thereto in the first place, not to mention to access the Internet via the external communication interfaces.

SUMMARY OF THE INVENTION

Accordingly, the disclosure is directed to a method for automatically updating a firmware and a host device, which may be used to solve the above technical problems.

The embodiments of the disclosure provide a method for automatically updating a firmware, applied to a host device. The method includes: accessing, by the host device, a target firmware from at least one detachable I/O device connected with the host device; and updating, by the host device, a host firmware of the host device based on the target firmware.

The embodiments of the disclosure provide a host device including a storage circuit and a processor. The storage circuit stores a program code. The processor is coupled to the storage circuit and accesses the program code to perform: accessing a target firmware from at least one detachable I/O device connected with the host device; and updating a host firmware of the host device based on the target firmware.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

DESCRIPTION OF THE EMBODIMENTS

Figure 1:
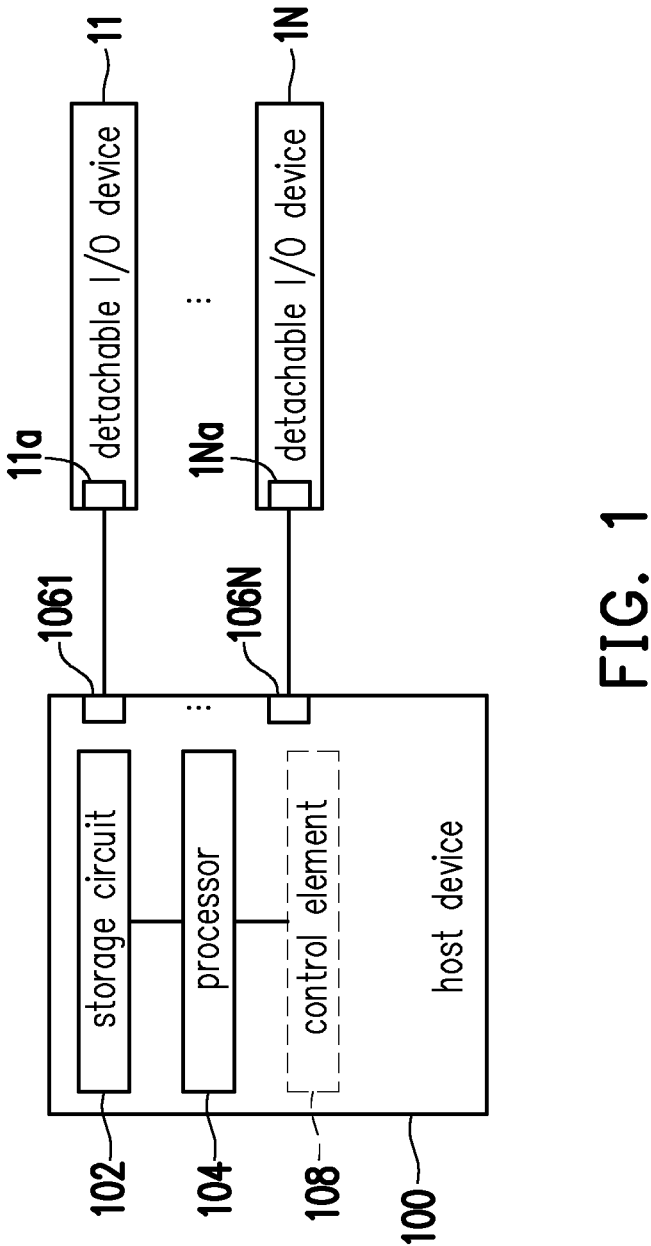
FIG. 1 shows a schematic diagram of a host device and several detachable I/O devices according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

See FIG. 1, which shows a schematic diagram of a host device and several detachable I/O devices according to an embodiment of the disclosure.

In the embodiments of the disclosure, each of the detachable I/O device 11 to 1N (N is a positive integer) can be detachably connected to the host device 100 to provide certain I/O (i.e., input/output) functions. For example, the detachable I/O device 11 may be configured with wired/wireless communication interfaces/circuits (e.g., Ethernet ports, Wi-Fi circuits, etc.) for providing wired/wireless communication functions, such that the host device 100 may access the Internet via the detachable I/O device 11 after the detachable I/O device 11 is connected with the host device 100. Additionally or alternatively, the detachable I/O device 11 may be configured with other interface, such as General Purpose Input Output (GPIO), USB, secure digital (SD) interfaces, but the disclosure is not limited thereto.

In one embodiment, the host device 100 may be disposed with docking portions 1061-106N, which can be respectively used to be docking with the corresponding docking portions 11a-1Na on the detachable I/O device 11-1N. For example, the docking portion 11a on the detachable I/O device 11 can be detachably docked/connected with the docking portion 1061 on the host device 100. Likewise, the docking portion 1Na on the detachable I/O device 1N can be detachably docked/connected with the docking portion 106N on the host device 100.

In various embodiments, the docking portions 1061-106N and the corresponding docking portions 11a-1Na can be designed in various forms based on the designer's requirements, such as corresponding magnetic portions, buckles, clamps, etc.

In some embodiments, the host device 100 can be connected with one or more of the detachable I/O device 11-1N to form an integrated device for providing specific functions. In one embodiment, the host device 100 can be connected with one or more of the detachable I/O device 11-1N to form a network switch or the like, but the disclosure is not limited thereto.

In FIG. 1, the host device 100 includes a storage circuit 102 and a processor 104. The storage circuit 102 is one or a combination of a stationary or mobile random access memory (RAM), read-only memory (ROM), flash memory, hard disk, or any other similar device, and which records a plurality of modules and/or a program code that can be executed by the processor 104.

The processor 104 may be coupled with the storage circuit 102, and the processor 104 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In the embodiments of the disclosure, the host device 100 does not include any communication interface (e.g., wired/wireless communication interfaces/circuits) and any connecting interface (e.g., slots for secure digital (SD) memory cards and/or USB devices) connectable with any external storage device (e.g., the SD memory cards and/or USB storage devices). In this case, the host device 100 cannot access the Internet on its own, which means that the host device 100 cannot download/access any files (e.g., firmware associated with the detachable I/O devices 11-1N) from the Internet on its own.

Likewise, the host device 100 cannot retrieve any files (e.g., firmware associated with the detachable I/O devices 11-1N) from any external storage device due the lack of connecting interface connectable with external storage device.

In the embodiments of the disclosure, in order to make the host device 100 capable of using the provided functions (e.g., the wired/wireless communication functions and/or other I/O functions) of the detachable I/O devices 11-1N, the host device 100 may need to be able to recognize the detachable I/O devices 11-1N connected thereto in advance. In this case, the host device 100 need to update the host firmware thereof based on the firmware associated with the detachable I/O devices 11-1N connected thereto.

For example, after the detachable I/O devices 11 is connected to the host device 100, the host device 100 need to update the host firmware thereof based on the firmware associated with the detachable I/O device 11, otherwise the host device 100 would not be able to use the function provided by the detachable I/O device 11 since the detachable I/O device 11 is unrecognizable to the host device 100.

However, since the host device 100 cannot access the Internet on its own, the host device 100 cannot retrieve/download the firmware associated with the detachable I/O device 11*s* connected thereto, which makes the host device 100 unable to recognize the detachable I/O device 11.

In the embodiments of the disclosure, a method for automatically updating a firmware has been proposed to resolve this technical problem.

In some embodiments, the processor 104 may access the modules and/or the program code stored in the storage circuit 102 to implement the method for automatically updating a firmware provided in the disclosure, which would be further discussed in the following.

Figure 2:
FIG. 2 shows a flow chart of the method for automatically updating a firmware according to an embodiment of the disclosure.

See FIG. 2, which shows a flow chart of the method for automatically updating a firmware according to an embodiment of the disclosure. The method of this embodiment may be executed by the host device 100 in FIG. 1, and the details of each step in FIG. 2 will be described below with the components shown in FIG. 1.

In step S210, the processor 104 accesses a target firmware from the detachable I/O devices 11-1N connected with the host device 100. In some embodiments, the host device 100 can also be connected with one detachable I/O device, but the disclosure is not limited thereto.

In step S220, the processor 104 updates the host firmware of the host device 100 based on the target firmware.

In the embodiments of the disclosure, one or more of the detachable I/O devices 11-1N can be designed to carry/store with the associated firmware for the host device 100 to accordingly update the host firmware.

For example, the detachable I/O device 11 can store/carry the firmware associated with the detachable I/O device 11 and/or other detachable I/O devices connected with the host device 100. For another example, the detachable I/O device 1N can store/carry the firmware associated with the detachable I/O device 1N and/or other detachable I/O devices connected with the host device 100, but the disclosure is not limited thereto.

In one embodiment, the processor 104 may determine a latest firmware stored on the detachable I/O devices 11-1N as the target firmware.

For example, the processor 104 may read the timestamp/version of each firmware stored on the detachable I/O devices 11-1N and determine the firmware with the latest timestamp/version as the target firmware considered in step S210 and accordingly update the host firmware in step S220.

In one embodiment, the in response to determining that a first detachable I/O device is connected with the host device 100 as one of the at least one detachable I/O device, the processor 104 accesses a first firmware associated with the first detachable I/O device from the first detachable I/O device as the target firmware and accordingly update the host firmware.

For better understanding, the detachable I/O device 11 would be assumed to be an example of the considered first detachable I/O device, but the disclosure is not limited thereto.

Under this assumption, when the processor 104 determines that the detachable I/O device 11 is connected with the host device 100, the processor 104 may accesses the firmware associated with the detachable I/O device 11 from the detachable I/O device 11 as the target firmware. In one embodiment, the firmware associated with the detachable I/O device 11 may be stored/carried in, for example, the built-in storage circuit of the detachable I/O device 11, and the processor 104 may retrieve/read the firmware associated with the detachable I/O device 11 from the built-in storage circuit of the detachable I/O device 11, but the disclosure is not limited thereto. Additionally or alternatively, the detachable I/O device 11 can be disposed with one or more storage medium (e.g., Electrically-Erasable Programmable Read-Only Memory (EEPROM) and/or NOR/NAND flash memories) for storing the device information (e.g., the model name) of the detachable I/O device 11. In various embodiments, the above storage medium can be the same built-in storage circuit for storing the target firmware or another storage circuit different from the above mentioned built-in storage circuit, but the disclosure is not limited thereto.

In one embodiment, the processor 104 may determine whether the first detachable I/O device (e.g., the detachable I/O device 11) is not recognizable to the host device 100. In response to determining that the first detachable I/O device is not recognizable to the host device 100, it means that the host firmware of the host device 100 has not been updated according to the first firmware associated with the first detachable I/O device. Therefore, the processor 104 may access the first firmware associated with the first detachable I/O device from the first detachable I/O device as the target firmware and accordingly update the host firmware. Afterwards, the first detachable I/O device would become recognizable to the host device 100, which allows the host device 100 to use the provided functions (e.g., wired/wireless communication functions) of the first detachable I/O device, but the disclosure is not limited thereto.

On the other hand, in response to determining that the first detachable I/O device is recognizable to the host device 100, it means that the host firmware of the host device 100 may have been updated according to the first firmware associated with the first detachable I/O device. Therefore, the processor 104 may not access the first firmware associated with the first detachable I/O device and/or update the host firmware accordingly, but the disclosure is not limited thereto.

In some embodiments, the processor 104 may determine whether an identifier of the first detachable I/O device is on a compatible list of the host device 100. In response to determining that the identifier of the first detachable I/O device is on the compatible list of the host device 100, the processor 104 may determine that the first detachable I/O device is recognizable to the host device 100. On the other hand, in response to determining that the identifier of the first detachable I/O device is not on the compatible list of the host device 100, the processor 104 may determine that the first detachable I/O device is not recognizable to the host device 100, but the disclosure is not limited thereto.

In some embodiments, after the host device 100 is able to recognize the first detachable I/O device via, for example, the associated host firmware updating, the processor 104 may further add the identifier of the first detachable I/O device to the compatible list of the host device 100, but the disclosure is not limited thereto.

In some embodiments, the compatible list of the host device 100 can also be configured in advance to record the detachable I/O devices recognizable to the host device 100, but the disclosure is not limited thereto.

In one embodiment, in response to determining that at least one of the detachable I/O devices 11-1N connected with the host device 100 is not recognizable to the host device 100, the processor 104 may access the target firmware from one or more of the detachable I/O devices 11-1N connected with the host device 100.

For example, if the processor 104 determines that the detachable I/O device 11 is not recognizable to the host device 100 (e.g., the detachable I/O device 11 is not on the compatible list of the host device 100), the processor 104 may access the target firmware from the detachable I/O devices 11, 1N, and/or other detachable I/O devices among the detachable I/O devices 11-1N. In this case, the processor 104 may use the firmware stored in the detachable I/O devices 11, 1N, and/or other detachable I/O devices among the detachable I/O devices 11-1N as the target firmware (e.g., the latest firmware as mentioned in the above), but the disclosure is not limited thereto.

In one embodiment, in response to determining that all of the detachable I/O devices 11-1N connected with the host device 100 are not recognizable to the host device 100 (e.g., all of the detachable I/O devices 11-1N are not on the compatible list of the host device 100), the processor 104 may access the target firmware from one or more of the detachable I/O devices 11-1N connected with the host device 100.

For example, if the processor 104 determines that all of the detachable I/O devices 11-1N are not recognizable to the host device 100, the processor 104 may access the target firmware from the detachable I/O devices 11, 1N, and/or other detachable I/O devices among the detachable I/O devices 11-1N. In this case, the processor 104 may use the firmware stored in the detachable I/O devices 11, 1N, and/or other detachable I/O devices among the detachable I/O devices 11-1N as the target firmware (e.g., the latest firmware as mentioned in the above), but the disclosure is not limited thereto.

In some embodiments of the disclosure, even though the host firmware has been updated to allow the host device 100 to use the provided functions of the first detachable I/O device, the host device 100 may still become unable to use the provided functions of the first detachable I/O device in some cases.

For example, if some elements (e.g., some physical layer (PHY) elements, such as Ethernet port) on the first detachable I/O device have been replaced with new elements, the host device 100 may become unable to use the functions associated with the replaced elements (e.g., Ethernet functions) of the first detachable I/O device, even though the first detachable I/O device is still recognizable to the host device 100.

To resolve this issue, the embodiments of the disclosure further provide a solution that allows the user to manually trigger a firmware updating function associated with the host device 100.

In one embodiment, in response to determining the firmware updating function has been manually triggered, the processor 104 may access the target firmware from the detachable I/O devices 11-1N connected with the host device 100 based on the above embodiments and accordingly update the host firmware.

In one embodiment, the host device 100 may be disposed with a (physical) control element 108 connected with the processor 104 for the user to manually trigger the firmware updating function associated with the host device 100. In various embodiments, the control element 108 may be, for example, a touch panel, a physical button, a (self-return) switch button, or the like.

Accordingly, the host device 100 would become able to use the provided functions of the first detachable I/O device (with the replaced elements) again, but the disclosure is not limited thereto.

In some embodiments, the processor 104 may automatically perform the firmware updating function whenever a detachable I/O device is being connected to the host device 100, such that the host device 100 can be guaranteed to be able to use the provided functions of the detachable I/O device (with or without replaced elements), but the disclosure is not limited thereto.

In some embodiments of the disclosure, the mentioned firmware may not be merely interpreted as a driver. Specifically, the firmware considered in the disclosure includes the bootloader (including partial drivers), operating system (including drivers), and FPGA binaries. To ensure the smooth operation of the detachable I/O devices (e.g., unrecognizable detachable I/O devices) with the host device 100, it is not sufficient to only update drivers of the host device 100. Therefore, even though the required target firmware are stored in an unidentifiable/unrecognizable device, the fundamental difference between drivers and firmware results in distinct application scenarios and scope of applicability.

In summary, the embodiments of the disclosure provide solutions for the host device to retrieve the required firmware for updating from the detachable I/O devices connected thereto, such that the host device can be able to use the provided function of the connected detachable I/O devices after accordingly updating the host firmware thereof.

In this case, even if the host device is not configured with any communication interface and any connecting interface connectable with any external storage device, the host device can still retrieve the required firmware and accordingly update the host firmware thereof.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

7

What is claimed is:

1. A method for automatically updating a firmware, applied to a host device, comprising:

accessing, by the host device, a target firmware from at least one detachable I/O device connected with the host device;

in response to determining, by a processor of the host device, that all of the at least one detachable I/O device connected with the host device are not recognizable to the host device, accessing the target firmware from the at least one detachable I/O device connected with the host device; and updating, by the host device and without connecting with any external storage device, a host firmware of the host device based on the target firmware.

2. The method according to claim 1, further comprising:

determining a latest firmware stored on the at least one detachable I/O device as the target firmware.

3. The method according to claim 1, wherein accessing the target firmware from the at least one detachable I/O device connected with the host device comprises:

in response to determining that a first detachable I/O device is connected with the host device as one of the at least one detachable I/O device, accessing, by the host device, a first firmware associated with the first detachable I/O device from the first detachable I/O device as the target firmware.

4. The method according to claim 3, further comprising:

in response to determining that the first detachable I/O device is not recognizable to the host device, accessing the first firmware associated with the first detachable I/O device from the first detachable I/O device as the target firmware.

5. The method according to claim 4, further comprising:

in response to determining that the identifier of the first detachable I/O device is not on the compatible list of the host device, determining that the first detachable I/O device is not recognizable to the host device.

6. The method according to claim 1, further comprising:

in response to determining a firmware updating function has been manually triggered, accessing the target firmware from the at least one detachable I/O device connected with the host device.

7. The method according to claim 6, further comprising:

in response to determining that a control element disposed on the host device is triggered, determining that the firmware updating function has been triggered.

8. The method according to claim 1, wherein the host device does not comprise any communication interface and any connecting interface connectable with any external storage device.

8

9. A host device, comprising:

a non-transitory storage circuit, storing a program code; and a processor, coupled to the non-transitory storage circuit and accessing the program code to perform:

accessing a target firmware from at least one detachable I/O device connected with the host device;

in response to determining that all of the at least one detachable I/O device connected with the host device are not recognizable to the host device, accessing the target firmware from the at least one detachable I/O device connected with the host device and updating a host firmware of the host device based on the target firmware without connecting with any external storage device.

10. The host device according to claim 9, wherein the processor further performs:

determining a latest firmware stored on the at least one detachable I/O device as the target firmware.

11. The host device according to claim 9, wherein the processor performs:

in response to determining that a first detachable I/O device is connected with the host device as one of the at least one detachable I/O device, accessing, by the host device, a first firmware associated with the first detachable I/O device from the first detachable I/O device as the target firmware.

12. The host device according to claim 11, wherein the processor further performs:

in response to determining that the first detachable I/O device is not recognizable to the host device, accessing the first firmware associated with the first detachable I/O device from the first detachable I/O device as the target firmware.

13. The host device according to claim 12, wherein the processor further performs:

in response to determining that the identifier of the first detachable I/O device is not on the compatible list of the host device, determining that the first detachable I/O device is not recognizable to the host device.

14. The host device according to claim 9, wherein the processor further performs:

in response to determining a firmware updating function has been manually triggered, accessing the target firmware from the at least one detachable I/O device connected with the host device.

15. The host device according to claim 14, wherein the processor further performs:

in response to determining that a control element disposed on the host device is triggered, determining that the firmware updating function has been triggered.

16. The host device according to claim 9, wherein the host device does not comprise any communication interface and any connecting interface connectable with any external storage device.

* * * * *